United States Patent
Bergman et al.

(10) Patent No.: US 9,491,253 B2
(45) Date of Patent: Nov. 8, 2016

(54) DATA STORAGE BASED ON CONTENT POPULARITY

(71) Applicant: Fastly Inc., San Francisco, CA (US)

(72) Inventors: Artur Bergman, San Francisco, CA (US); Rogier Mulhuijzen, The Hague (NL)

(73) Assignee: Fastly, Inc., San Francisco, CA (US)

( * ) Notice: Subject to any disclaimer, the term of this patent is extended or adjusted under 35 U.S.C. 154(b) by 196 days.

(21) Appl. No.: 14/091,759

(22) Filed: Nov. 27, 2013

(65) Prior Publication Data
US 2014/0149533 A1 May 29, 2014

Related U.S. Application Data

(60) Provisional application No. 61/730,419, filed on Nov. 27, 2012.

(51) Int. Cl.
*H04L 29/08* (2006.01)
*H04N 21/231* (2011.01)
*H04L 29/06* (2006.01)

(52) U.S. Cl.
CPC ....... *H04L 67/2842* (2013.01); *H04L 67/1097* (2013.01); *H04N 21/231* (2013.01); *H04N 21/23106* (2013.01); *H04L 65/4084* (2013.01)

(58) Field of Classification Search
CPC ........... H04L 67/2842; H04L 67/1097; H04L 65/4084; H04L 67/1095; G06F 12/0802; H04N 21/231; H04N 21/23106
See application file for complete search history.

(56) References Cited

U.S. PATENT DOCUMENTS

| | | | |
|---|---|---|---|
| 2003/0005457 A1* | 1/2003 | Faibish et al. | 725/94 |
| 2007/0143560 A1 | 6/2007 | Gorobets | |
| 2010/0146197 A1 | 6/2010 | Gorobets | |
| 2010/0332595 A1* | 12/2010 | Fullagar et al. | 709/203 |
| 2011/0093905 A1* | 4/2011 | McKinley et al. | 725/92 |
| 2013/0204961 A1* | 8/2013 | Fliam et al. | 709/214 |

* cited by examiner

*Primary Examiner* — Chris Parry
*Assistant Examiner* — Daeoo Lee

(57) ABSTRACT

Methods, systems, and software for operating a data storage system of a content delivery node are provided herein. In one example, a method of operating a data storage system of a content delivery node is presented. The method includes receiving content data into a storage system, storing the content data in a first storage space, determining popular content data within the content data based on at least user requests for the content data, and storing the popular content data in a second storage space.

18 Claims, 6 Drawing Sheets

DATA STORAGE BASED ON CONTENT POPULARITY

RELATED APPLICATIONS

This application hereby claims the benefit of and priority to U.S. Provisional Patent Application 61/730,419, titled "DATA STORAGE BASED ON CONTENT POPULARITY," filed Nov. 27, 2012, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery systems have been developed which add a layer of caching between the origin servers of the content providers and the end users. The content delivery systems typically have one or more content delivery nodes distributed across a large geographic region to provide faster and lower latency access to the content for the end users. When end users request content, such as a web page, which is handled through a content delivery node, the content delivery node is configured to respond to the end user requests instead of the origin servers. In this manner, a content delivery node can act as a proxy for the origin servers.

Content of the origin servers can be cached into the content delivery nodes, and can be requested via the content delivery nodes from the origin servers of the content originators when the content has not yet been cached. Content delivery nodes usually cache only a portion of the original source content rather than caching all content or data associated with an original content source. The content delivery nodes can thus maintain only recently accessed and most popular content as cached from the original content sources. Thus, content delivery nodes exchange data with the original content sources when the end users request new or uncached information or if something has changed in the original content source data.

OVERVIEW

Methods, systems, and software for operating a data storage system of a content delivery node are provided herein. In one example, a method of operating a data storage system of a content delivery node is presented. The method includes receiving content data into a storage system, storing the content data in a first storage space, determining popular content data within the content data based on at least user requests for the content data, and storing the popular content data in a second storage space.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple examples are described in connection with these drawings, the disclosure is not limited to the examples disclosed herein. On the contrary, the intent is to cover all alternatives, modifications, and equivalents.

DESCRIPTION

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 1, such as "www.gamma.gov," "www.alpha.com," and "www-.beta.net," among others. In some examples, origin servers can serve the content to end user devices. However, when a content delivery system is employed, the content delivery system can act as a proxy to cache content delivery between origin servers and the end user devices.

Content delivery systems can add a layer of caching between origin servers of the content providers and the end users. The content delivery systems typically have one or more content delivery nodes distributed across a large geographic region to provide faster and lower latency local access to the content for the end users. When end users request content, such as a web page, a locally proximate content delivery node will respond to the content request instead of the associated origin server. Various techniques can be employed to ensure the content delivery node responds to content requests instead of the origin servers, such as associating web content of the origin servers with network addresses of the content delivery nodes instead of network addresses of the origin servers using domain name system (DNS) registration and lookup procedures.

Figure 1:
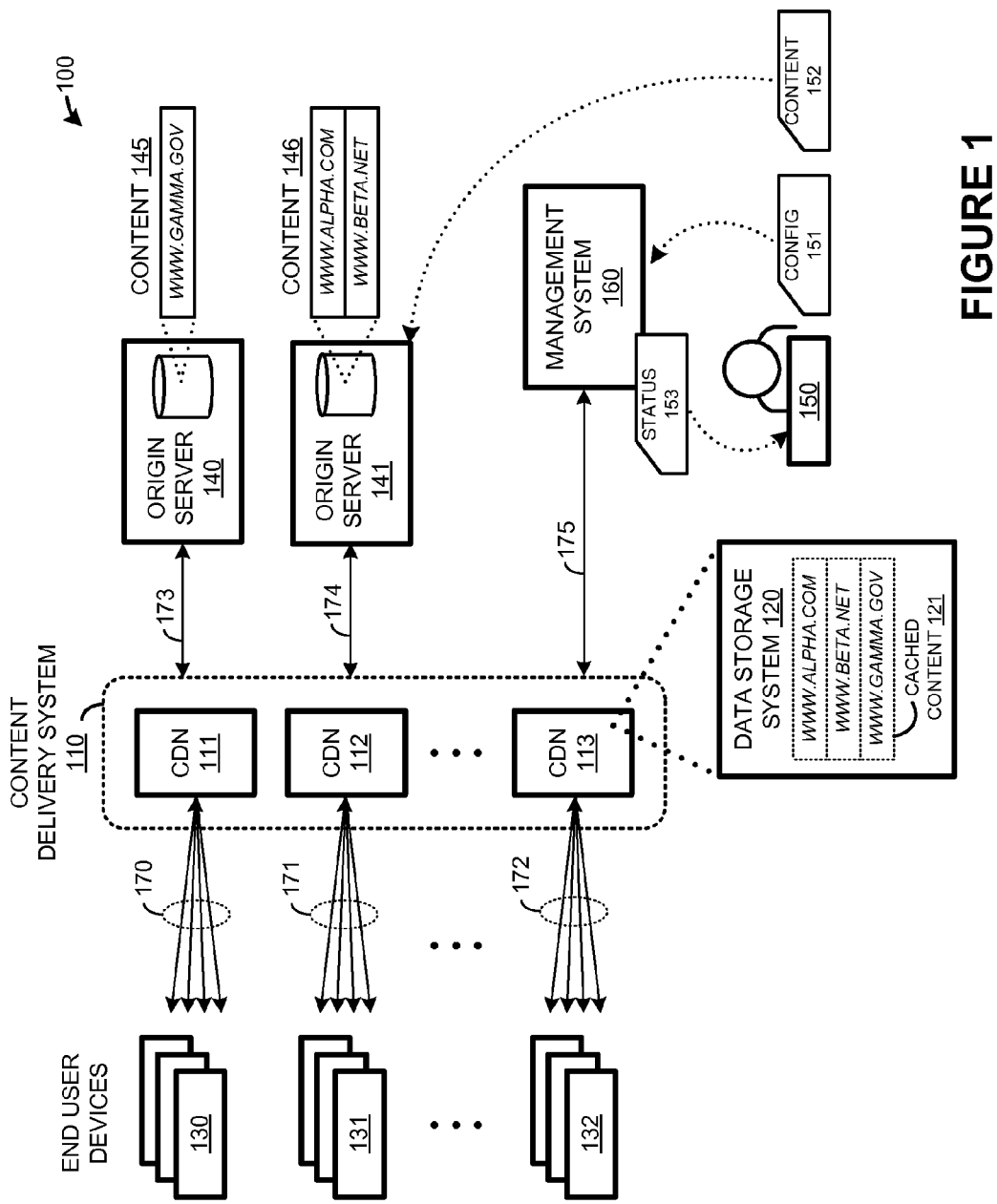
FIG. 1 illustrates a communication system according to one example.

As a first example employing a content delivery system, FIG. 1 is presented. FIG. 1 is a system diagram illustrating communication system 100. Communication system 100 includes content delivery system 110, end user devices 130-132, origin servers 140-141, and management system 160. Content delivery system 110 includes one or more content delivery nodes (CDN) 111-113. Each of CDN 111-113 can include one or more data storage systems, such as that illustrated for CDN 113 as data storage system 120. End user devices 130-132 are representative of a plurality of end user devices that can request and receive network content, and any number of end user devices 130-132 can be associated with each of content delivery nodes 111-113. CDN 111-113 and ones of end users 130-132 communicate over associated network links 170-172. Content delivery system 110 and origin servers 140-141 communicate over associated network links 173-174. Content delivery system 110 and management system 160 communicate over link 175. Although not shown in FIG. 1 for clarity, each of CDN 111-113 can also communicate with each other over network links.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content delivery nodes 111-113 of content delivery system 110 receive the content requests over ones of links 170-172 and processes the content requests for delivery of the content to the associated end user devices 130-132. Requested network content that is already stored in ones of CDN 111-113 can be provided quickly to the end user devices, while network content that is not already stored in ones of CDN 111-113 can be responsively requested by an associated one of CDN 111-113 from an appropriate origin server 140-141 for delivery by the CDN and possible caching by the CDN. In this manner, each of CDN 111-113 can act as intermediary proxy nodes to provide local and fast access for end user devices 130-132 to network content of origin servers 140-141 without burdening origin servers 140-141. FIG. 1 shows cached content 121 included in data storage system 120 of CDN 113 as comprised of content 145-146, and thus content 145-146 is currently shown as cached by CDN 113. Other configurations are possible, including subsets of content 145-146 being cached in individual ones of CDN 111-113.

Although FIG. 1 shows content 145-146 of origin servers 140-141 being cached by data storage system 120, other content can be handled by CDN 111-113. For example, dynamic content generated by activities of end user devices 130-132 need not originally reside on origin servers 140-141, and can be generated due to scripting or code included in web page content delivered by CDN 111-113. This dynamic content can also be cached by ones of CDN 111-113, and can be specific to a particular end user device during a communication session.

Management system 160 handles configuration changes and status information collection and delivery for system operators and for the origin server operators or managers. For example, operator device 150 can transfer configuration 151 for delivery to management system 160, where configuration 151 can alter the handling of network content requests by CDN 111-113, among other operations. Also, management system 160 can monitor status information for the operation of CDN 111-113, such as operational statistics, and provide this status information as 153 to operator device 150. Furthermore, operator device 150 can transfer content 152 for delivery to origin servers 140-141 to include in content 145-146. Although one operator device 150 is shown in FIG. 1, it should be understood that this is merely representative and communication system 100 can include many operator devices for receiving status information, providing configuration information, or transferring content to origin servers.

Figure 2:
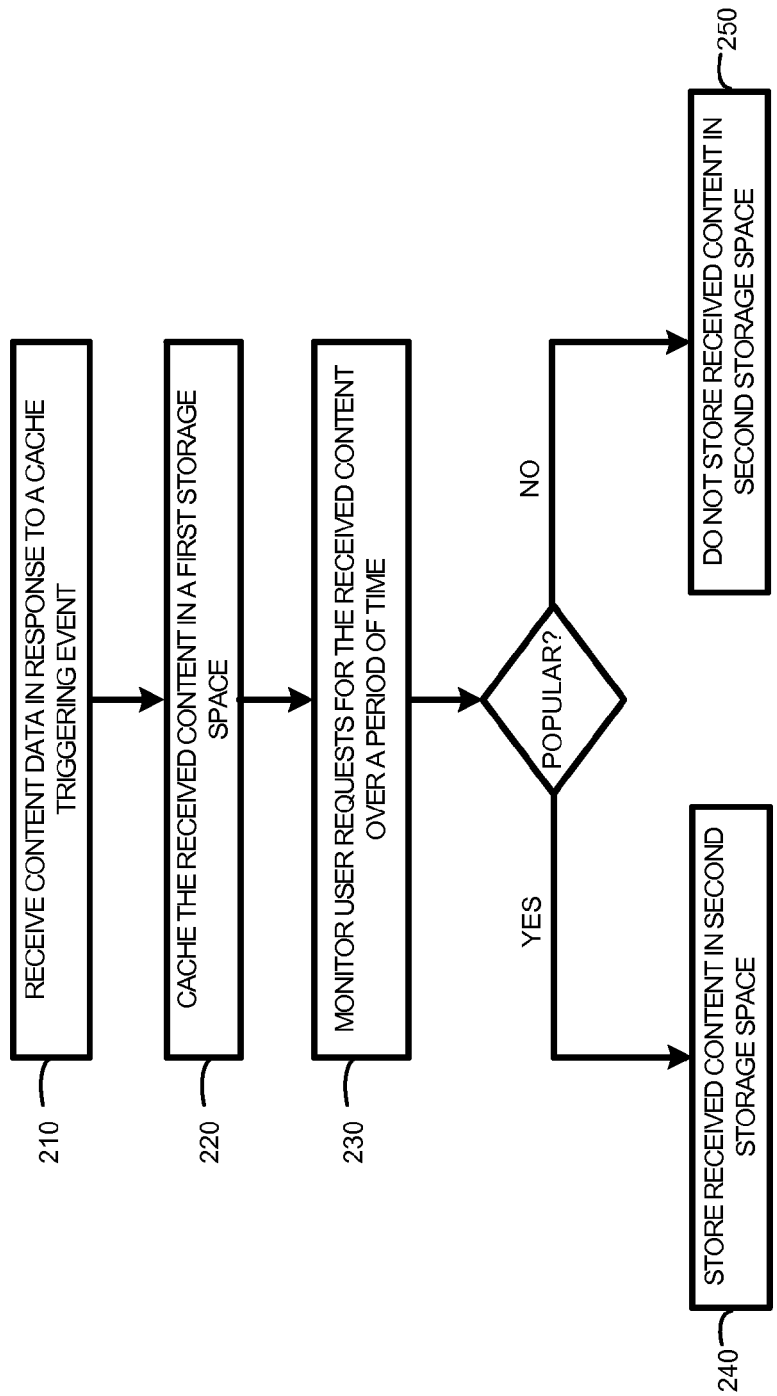
FIG. 2 illustrates a method of operation of a data storage system.

FIG. 2 illustrates a flow diagram that describes an example of operation of a data storage system, such as for data storage system 120 of FIG. 1. The operations of FIG. 2 are referenced parenthetically in the description below.

In FIG. 2, data storage system will receive content data due to a cache triggering event (210). A cache triggering even can include an end user device request for the content, an indication of updated origin content to replace existing cached content, dynamic end user content, or the caching algorithms employed by CDN 113, such as predictive caching, among other operations. Such content can include text, hypertext markup language (HTML) pages, pictures, video, audio, code, scripts, or other content viewable by an end user in a browser or other application. The data storage system caches the received content in a first storage space (220). In one example, the first storage space can comprise a volatile random-access memory, such as dynamic random access memory (DRAM).

Thereafter, requests for the cached content by end users will be monitored to determine a popularity of the cached content (230). The popularity of the content can be determined by establishing a popularity threshold for the content. The popularity threshold can be determined based on a quantity of end user requests for the content, or a portion thereof, over a period of time. This period of time can be over the duration from when the content is cached until the next downtime or idle time for the data storage system, can be until a certain time of day (such as night time), or can be over any other period of time. In some examples, the popularity can be determined by the number of requests by the end users for the cached content compared to a threshold quantity of requests. In other examples, the popularity can be determined by the percentage of requests by the end users related to a total amount of requests for other content for the cached content compared to a threshold popularity percentage. In still other examples, the popularity can be determined using any statistical measure of the requests for the cached content. Management system 160 can be used in some examples to define the requirements necessary for content to be considered popular.

If the cached content is determined to be popular, such as by being requested enough times by the end users or exceeding a popularity threshold, the system will transfer the cached content into a second storage space (240). Alternatively, if the cached content is not popular, such as by not being requested enough times by the end users or not exceeding the popularity threshold, the storage system will not store the cached content in the second storage space (250). The second storage space can consist of hard drives, solid state drives, or any other similar form of nonvolatile memory.

In one example, the content transferred to the second storage space may be removed or deleted from the first storage space. In another example, the content transferred to the second storage space may remain in the first storage space.

In one example, the content not transferred to the second storage space may be removed or deleted from the first storage space. In another example, the content not transferred to the second storage space may remain in the first storage space.

The caching capacity of CDN 113 bounded by the combined capacity of its first and second storage spaces. This caching capacity is effectively diminished when the same cached content is duplicated in both storage spaces. Reduced caching capacity may cause more cache misses and so increase the load on the origin server and increase response latency. Caching capacity can be preserved by evicting from a full storage space some cached content that resides in both storage spaces. One way to minimize duplication is to reduce the popularity score of content that simultaneously resides in both storage spaces, thereby making evicting from the first storage space more likely for content that already resides in the second storage space. For example content duplicated in both storage spaces may always be deemed unpopular when selecting content to evict from the first storage space, regardless of counted requests.

A poorly chosen popularity threshold may degrade the performance of CDN 113. If the threshold is too low, too much cached content is transferred to the second storage space. Excessive transferring overwhelms the second storage space, which succumbs to churn. If the threshold is too high, the second storage space may be underutilized, either by filling incompletely or by retaining content no longer needed.

Caching relies on repeated requests for the same content. Caching works best when these requests are clustered in time. Requests for some content may be repeated but not clustered in time. Caching such content faces two hurdles. Because the requests are not clustered in time, the content may be scored as unpopular most of the time. Even if the content is recognized as popular and transferred to the second storage space, the content may soon be evicted from both storage spaces for lack of popularity. For example it may be optimal to cache an online cookbook all day, even though its recipes only score as popular before meals. This scenario can be accommodated in two ways. The time interval over which CDN 113 measures popularity can be increased such that intermittent requests for the same content are counted in the same interval, thereby increasing the measured popularity of the content. A more sophisticated implementation may, in addition to increasing the popularity measurement interval, weight the requests according to recentness such that a recent request increases the popularity score more than does an older request in the same time interval.

Figure 3:
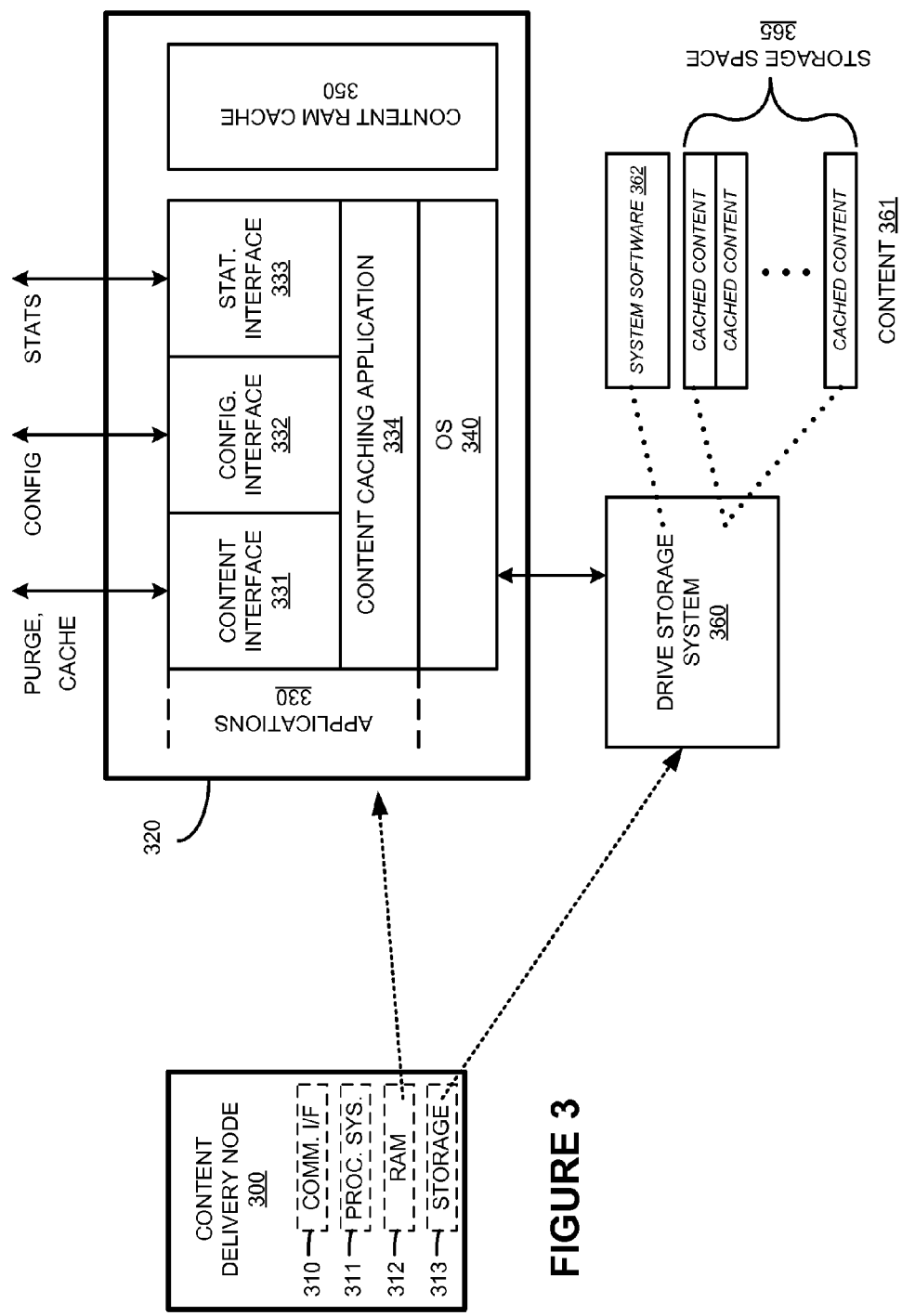
FIG. 3 illustrates a block diagram of a content delivery node.

To further describe the operation of any CDN 111-113 in FIG. 1, FIG. 3 is provided which illustrates content delivery node (CDN) 300. It should be understood that CDN 111-113 can each use other configurations, and CDN 300 is merely one example. CDN 300 includes communication interface 310, processing system 311, random access memory (RAM) 312, and storage 313. Example contents of RAM 312 are further detailed in RAM space 320, and example contents of storage 313 are further detailed in storage system 360.

In operation, processing system 311 is operatively linked to communication interface 310, RAM 312, and storage 313. Processing system 311 is capable of executing software stored in RAM 312 or storage 313. When executing the software, processing system 311 drives CDN 300 to operate as described herein. CDN 300 can also include other elements, such as user interfaces, computer systems, databases, distributed storage and processing elements, and the like.

Processing system 311 can be implemented within a single processing device but can also be distributed across multiple processing devices or sub-systems that cooperate in executing program instructions. Examples of processing system 311 include general purpose central processing units, microprocessors, application specific processors, and logic devices, as well as any other type of processing device.

Communication interface 310 includes one or more network interfaces for communicating over communication networks, such as packet networks, the Internet, and the like. The network interfaces can include one or more local or wide area network communication interfaces that can communicate over Ethernet or Internet protocol (IP) links. Examples of communication interface 310 include network interface card equipment, transceivers, modems, and other communication circuitry.

RAM 312 and storage 313 together can comprise a data storage system, such as that illustrated in data storage system 120 in FIG. 1, although variations are possible. RAM 312 and storage 313 can each comprise any storage media readable by processing system 311 and capable of storing software. RAM 312 can include volatile and nonvolatile, removable and non-removable media implemented in any method or technology for storage of information, such as computer readable instructions, data structures, program modules, or other data. Storage 313 can include non-volatile storage media, such as hard drives, solid state storage media, flash memory, or as illustrated by drive storage system 360 in this example. RAM 312 and storage 313 can each be implemented as a single storage device but can also be implemented across multiple storage devices or sub-systems. RAM 312 and storage 313 can each comprise additional elements, such as controllers, capable of communicating with processing system 311. In some implementations, the storage media can be a non-transitory storage media. In some implementations, at least a portion of the storage media can be transitory. It should be understood that in no case are the storage media propagated signals.

Software stored on or in RAM 312 or storage 313 can comprise computer program instructions, firmware, or some other form of machine-readable processing instructions having processes that when executed by processing system 311 direct CDN 300 to operate as described herein. For example, software drives CDN 300 to receive requests for content, determine if the content is stored in CDN 300, retrieve content from origin servers, transfer content to end user devices, manage data storage systems for handling and storing the content, among other operations. The software can also include user software applications. The software can be implemented as a single application or as multiple applications. In general, the software can, when loaded into processing system 311 and executed, transform processing system 311 from a general-purpose device into a special-purpose device customized as described herein.

RAM space 320 illustrates a detailed view of an example configuration of RAM 312. It should be understood that different configurations are possible. RAM space 320 includes applications 330, operating system (OS) 340, and content RAM cache 350. Content RAM cache 350 includes RAM space for temporary storage of content received over content interface 331, such as dynamic random access memory (DRAM). In at least one example, content RAM cache 350 can correspond to the first data space from FIG. 2.

Applications 330 include content interface 331, configuration interface 332, statistics interface 333, and content caching application 334. Content caching application 334 handles caching of content and management of storage spaces, such as content RAM cache 350 and storage space 365, as well as exchanges content, data, and instructions via content interface 331, configuration interface 332, and statistics interface 333. Content caching application 334 can comprise a custom application, Varnish caching software, hypertext transfer protocol (HTTP) accelerator software, or other content caching and storage applications, including variation, modifications, and improvements thereof. Applications 330 and OS 340 can reside in RAM space 320 during execution and operation of CDN 300, and can reside in system software storage space 362 on drive storage system 360 during a powered-off state, among other locations and states. Applications 330 and OS 340 can be loaded into RAM space 320 during a startup or boot procedure as described for computer operating systems and applications.

Content interface 331, configuration interface 332, and statistics interface 333 each allows a user to interact with and exchange data with content caching application 334. In some examples, each of content interface 331, configuration interface 332, and statistics interface 333 comprise an application programming interface (API). Content interface 331 allows for exchanging content for caching in CDN 300 by content caching application 334, and can also receive instructions to purge or erase data from CDN 300. Configuration interface 332 allows for altering the configuration of various operational features of content caching application 334. In some examples, configuration interface 332 comprises a scripting language interface, such as Varnish Configuration Language (VCL), Perl, PHP, Javascript, or other scripting or interpreted language-based interfaces. Statistics interface 333 allows for exchange of statistical information related to the operation of CDN 300, such as the popularity of content items in content RAM cache 350, cache hits/misses, cache fullness information, cache performance statistics, timing statistics, history metrics, among other statistical information. Content interface 331, configuration interface 332, and statistics interface 333 each can communicate with external systems via communication interface 310 over any associated network links.

Drive storage system 360 illustrates a detailed view of an example configuration of storage 313, and in some examples storage space 365 comprises the second storage space as described in FIG. 2. Storage system 360 can comprise flash memory such as NAND flash or NOR flash memory, hard drives, among similar data storage technologies. As shown in FIG. 3, drive storage system 360 includes software 362, as well as content 361 stored in storage space 365. As described above, system software 362 can be a non-volatile storage space for applications 330 and OS 340 during a powered-down state of CDN 300, among other operating software. Content 361 includes cached content, such as the web content examples in FIG. 1, which can include text, data, pictures, video, audio, web pages, scripting, code, dynamic content, or other network content.

It should be understood that content delivery node 300 is generally intended to represent a computing system with which at least software 330 and 340 are deployed and executed in order to render or otherwise implement the operations described herein. However, content delivery node 300 can also represent any computing system on which at least software 330 and 340 can be staged and from where software 330 and 340 can be distributed, transported, downloaded, or otherwise provided to yet another computing system for deployment and execution, or yet additional distribution.

Figure 4:
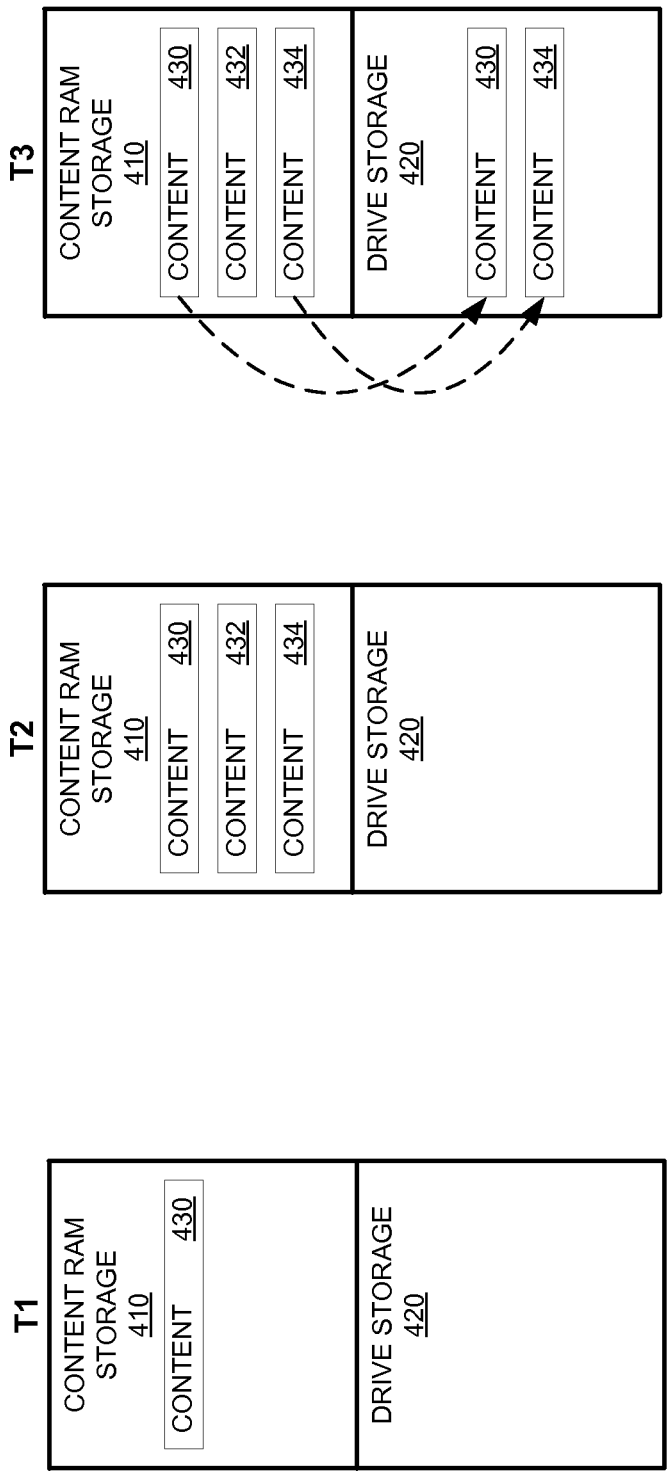
FIG. 4 illustrates a method of operation of a data storage system.

FIG. 4 illustrates a flow diagram that describes an example of operation of a data storage system, such as for data storage system 120 of FIG. 1. FIG. 4 includes content RAM storage 410 that can correspond to content RAM cache 350, drive storage 420 that can correspond to drive storage system 360, as well as various examples of content 430-434. Content 430-434 can include text, hypertext markup language (HTML) pages, pictures, video, audio, code, scripts, or other content viewable by an end user in a browser or other application.

The method begins at time T1 by storing requested content 430 in content RAM storage 410, upon a cache triggering event. A cache triggering event can include an end user device request for the content, an indication of updated origin content to replace existing cached content, dynamic end user content, or the caching algorithms employed by CDN 113, such as predictive caching, among other operations.

Next, at time T2, additional content 432, 434 can be stored in content RAM storage 410, upon one or more other cache triggering events. Although three content items are included in the present example, it should be understood that any number of content items could be stored.

As content 430-434 is saved in content RAM storage 410, the number of requests for content 430-434 can be tracked to determine the popularity of the content. This tracking for popularity can be over a set period of time, can be until a downtime in the system, can be until a specific time predetermined time, or any other period of time. Popularity of the content can be determined from the number of requests made for the content, the ratio of requests made for the content in comparison to the total requests for all content, or any other measure of popularity for the content. These popularity numbers can then be compared to a threshold value (request number, ratio number, percentage, etc.) to classify the content as popular or unpopular.

After content 430-434 has been tracked over the specified period of time and has been classified as popular or unpopular, the popular content is then stored in drive storage 420 at time T3. In the present example content 430 and content 434 were considered popular, however, any number of content can be considered popular.

In some examples, the data cached to drive storage 420 may be removed or deleted from content RAM storage 410. In other examples, the data cached to drive storage 420 may remain in content RAM storage 410.

In some examples, the data not cached to drive storage 420 may be removed or deleted from content RAM storage 410. In other examples, the data cached to drive storage 420 may remain in content RAM storage 410.

Figure 5:
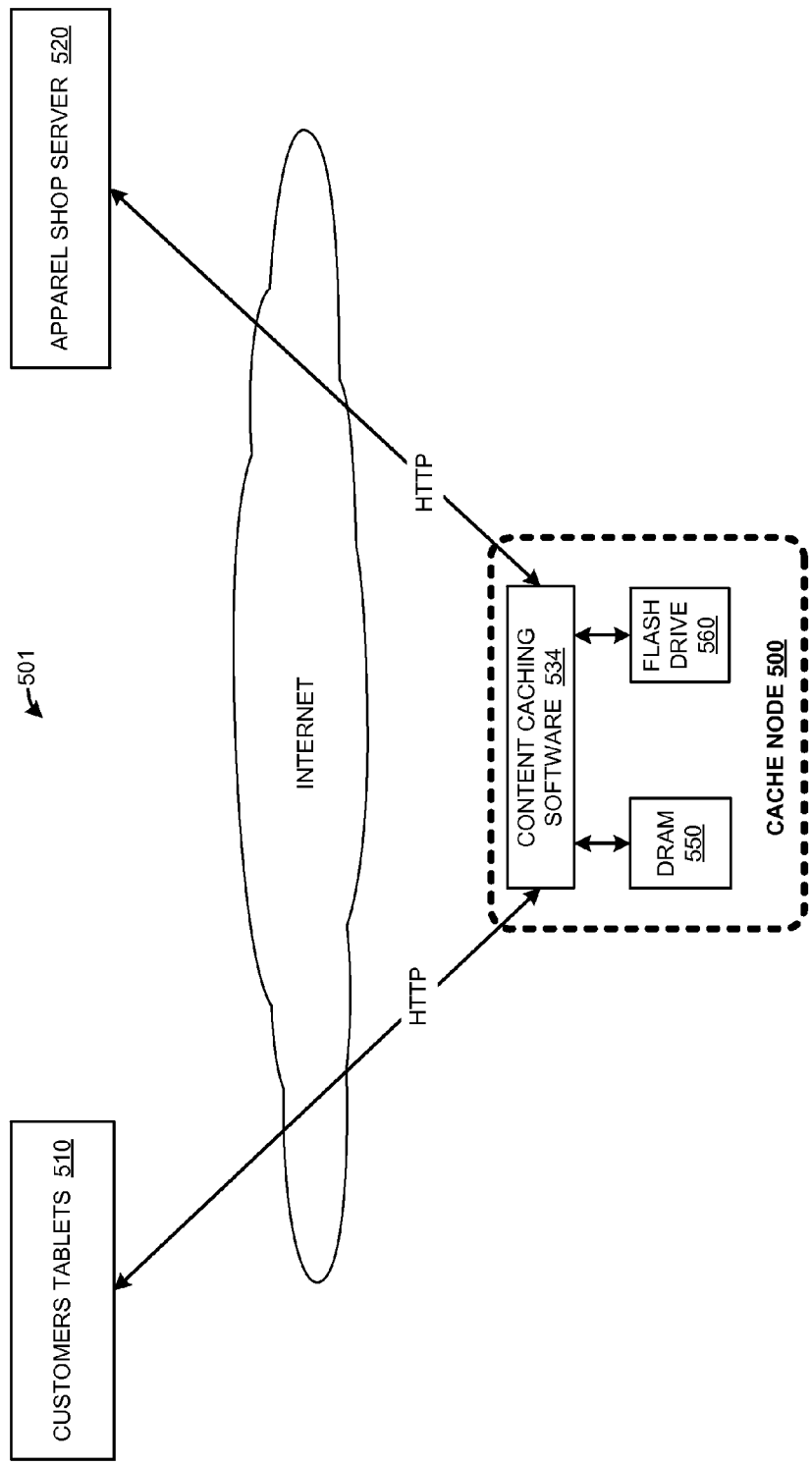
FIG. 5 illustrates a communication system according to one example.

FIG. 5 illustrates communication system 501. Communication system 501 includes apparel shop server 520 and customers' tablets 510 which use HTTP to communicate over the Internet with cache node 500. Although links using the HTTP protocol are shown in FIG. 5, it should be understood that other links and protocols can be employed. Ones of customer tablets 510 can communicate with cache node 500 for access to content of apparel shop server 520 that is cached by cache node 500.

Cache node 500 includes content caching software 534, DRAM 550, and flash drive 560. Cache node 500 is an example that customizes CDN 300 of FIG. 3 for efficient handling of repeated end user requests for the same dynamically generated content. FIG. 5 shows cache node 500 taking content requests sent from tablets 510 of customers browsing a website hosted on apparel shop server 520. The apparel website lets customers search for products by keyword. Apparel shop server 520 dynamically generates search results for each product keyword search that it receives. Customers use tablets or other Internet devices to browse the apparel website and enter product keyword searches. In this example, users of customer tablets 510 enter product searches for the keyword "hats."

Figure 6:
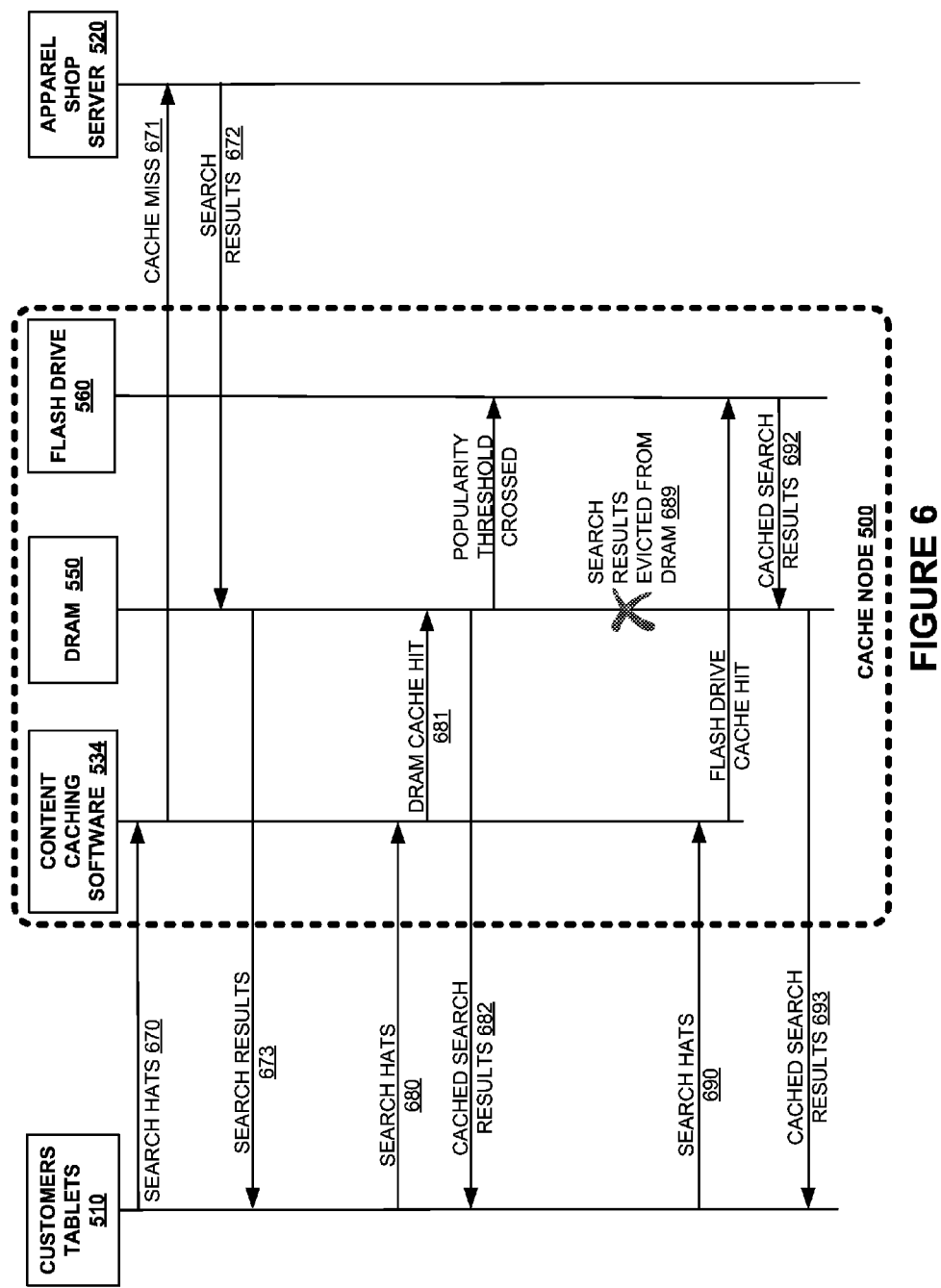
FIG. 6 illustrates a method of operation of a data storage system.

Cache node 500 is included to prevent apparel shop server 520 from being overwhelmed by product keyword searches. Cache node 500 accomplishes this by handling repeated product search requests having the same keywords without involving apparel shop server 520. FIG. 6 illustrates this by showing multiple search requests 670, 680, and 690 by customers for the keyword "hats," but only search request 670 of those is actually sent to apparel shop server 520. Although FIG. 6 shows three search requests sent to cache node 500, two thirds of these are handled without involving apparel shop server 520.

All product keyword searches are intercepted by cache node 500 and examined by content caching software 534 which corresponds to content caching application 334 in FIG. 3. For each search request, content caching software 534 checks whether matching search results are cached in DRAM 550 which corresponds to content RAM cache 350 of FIG. 3. Search request 670 shows how cache node 500 performs when DRAM 550 is empty. This causes cache miss 671 for which cache node 500 delegates the product keyword search to apparel shop server 520 acting as origin server. Apparel shop server 520 spends two seconds performing the product search and then returns search results 672 to cache node 500 which caches the search results in DRAM 550. Cache node 500 relays a copy as search results 673 back to inquiring customer 510. DRAM 550 is no longer an empty cache. Cache node 500 is ready to offload from apparel shop server 520 the remaining product keyword searches 680 and 690.

Eventually some other customer 510 enters the same product keyword search for hats. Since DRAM 550 already has the corresponding search results, content caching software 534 handles search request 680 differently than search request 670 was handled. Cache node 500 reacts to DRAM cache hit 681 by sending cached search results 682 back to this other user. Cache node 500 also notices that the keyword "hats" has now been searched twice. In this example the popularity threshold is 1 end user request. Having crossed the popularity threshold, cached search results 682 is written to durable storage, shown as flash drive 560 which corresponds to drive storage system 360 in FIG. 3. Flash drive 560 may be any internal or external solid state drive. A removable drive such as a USB flash drive allows for replacement of a failed drive by hot swapping in a spare drive. As such an implementation of cache node 500 may avoid downtime when its drive needs replacement.

Despite the cache having some contents, a cache miss may still occur, as when a customer enters a unique keyword search that is unlikely to already be cached, such as "extra large striped hats." Hence apparel shop server 520 might always receive a small subset of search requests. In this example a search results already residing in flash drive 560 may eventually be evicted from DRAM 550 while remaining in flash drive 560, shown as DRAM eviction 689. Cache node 500 handles this without any additional load on apparel shop 520 as shown by product keyword search request 690. Although DRAM 550 lacks results for search request 690, DRAM 550 receives cached search results 692 as retrieved from flash drive 560. Cache node 500 relays a copy as cached search results 693 back to a customer 510.

Referring back to FIG. 1, CDN 111-113, origin servers 140-141, and management system 160 can each include communication interfaces, network interfaces, processing systems, computer systems, microprocessors, storage systems, storage media, or some other processing devices or software systems, and can be distributed among multiple devices. Examples of CDN 111-113, origin servers 140-141, and management system 160 can each include software such as an operating system, logs, databases, utilities, drivers, caching software, networking software, and other software stored on a computer-readable medium. Content delivery system 110, in addition to including CDN 111-113, can include equipment and links to route communications between CDN 111-113 and any of end user devices 130-132, origin servers 140-141, and management system 160, among other operations.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 170-175 each use metal, glass, optical, air, space, or some other material as the transport media. Communication links 170-175 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-175 can each be a direct link or can include intermediate networks, systems, or devices, and can include a logical network link transported over multiple physical links. Although one main link for each of links 170-175 is shown in FIG. 1, it should be understood that links 170-175 are merely illustrative to show communication modes or access pathways. In other examples, further links can be shown, with portions of the further links shared and used for different communication sessions or different content types, among other configurations. Communication links 170-175 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a data storage system of a cache node of a content delivery network that caches content for delivery to end user devices, the method comprising:
   receiving over a network interface the content transferred by one or more origin servers for caching into the data storage system;
   responsive to receiving the content, storing the content in a first storage space in the data storage system comprising volatile memory;
   monitoring popularity measurements related to end user requests received over the network interface for the content to determine portions of the content which exceed a popularity score threshold based on at least the end user requests for the content;
   responsive to the portions of the content exceeding the popularity score threshold, transferring the portions of the content for storage in a second storage space in the data storage system comprising nonvolatile storage, wherein transferring the portions of the content for storage in the second storage space comprises either retaining the portions in the first storage space or removing the portions from the first storage space; and
   responsive to transferring the portions of the content for storage in the second storage space, and when the portions of the content are simultaneously stored in both the first storage space and the second storage space, identifying the portions of the content stored in the first storage space as content to evict, and reducing a popularity score associated with the portions of the content to establish an eviction for the content to evict.

2. The method of claim 1, further comprising:
removing from the first storage space the portions of the content which do not exceed the popularity score threshold.

3. The method of claim 1 wherein monitoring the popularity measurements comprises calculating a count of the end user requests for the content weighted according to the recentness of the end user requests for the content.

4. The method of claim 1 wherein the popularity score threshold comprises at least one of a count of the end user requests for the content and a percentage among all end user requests that are for the content.

5. The method of claim 1, further comprising:
treating as unpopular content already residing in the second storage space.

6. The method of claim 1 wherein the content transferred by the one or more origin servers comprises content that was dynamically generated by the one or more origin servers.

7. The method of claim 1 wherein the second storage space comprises at least one of a flash drive and a hard drive.

8. The method of claim 1 wherein the first storage space comprises a random access memory (RAM).

9. The method of claim 1 wherein the content comprises video.

10. A software apparatus comprising:
one or more non-transitory computer readable storage media; and
program instructions stored on the one or more computer readable media and executable by a processing system to operate a data storage system of a cache node of a content delivery network that caches content for delivery to end user devices, wherein the program instructions, when executed by the processing system, direct the processing system to at least:
receive over a network interface the content transferred by one or more origin servers for caching into the data storage system;
responsive to receiving the content, store the content in a first storage space in the data storage system comprising volatile memory;
monitor popularity measurements related to end user requests received over the network interface for the content to determine portions of the content which exceed a popularity score threshold based on at least the end user requests for the content;
responsive to the portions of the content exceeding the popularity score threshold, transfer the portions of the content for storage in a second storage space in the data storage system comprising nonvolatile storage, wherein the transfer of the portions of the content for storage in the second storage space comprises either retaining the portions in the first storage space or removing the portions from the first storage space; and
responsive to transferring the portions of the content for storage in the second storage space, and when the portions of the content are simultaneously stored in both the first storage space and the second storage space, identify the portions of the content stored in the first storage space as content to evict, and reduce a popularity score associated with the portions of the content to establish an eviction for the content to evict.

11. The software apparatus of claim 10 wherein the program instructions, when executed by the processing system, further direct the processing system to at least:
remove from the first storage space the portions of the content which do not exceed the popularity score threshold.

12. The software apparatus of claim 10 configured to monitor the popularity measurements by at least calculating a count of the end user requests weighted according to the recentness of the end user requests.

13. The software apparatus of claim 10 wherein the popularity score threshold comprises at least one of a count of the end user requests for the content and a percentage among all end user requests that are for the content.

14. The software apparatus of claim 10 configured to monitor the popularity measurements by at least treating as unpopular content already residing in the second storage space.

15. The software apparatus of claim 10 wherein the content transferred by the one or more origin servers comprises content that was dynamically generated by the one or more origin servers.

16. The software apparatus of claim 10 wherein the second storage space comprises at least one of a flash drive and a hard drive.

17. The software apparatus of claim 10 wherein the first storage space comprises a random access memory (RAM).

18. The software apparatus of claim 10 wherein the content comprises video.

* * * * *